United States Patent [19]
Sackett

[11] 3,920,336
[45] Nov. 18, 1975

[54] SYSTEM FOR INTENSIFICATION OF WEAK ABSORPTION AND COLLECTION OF WEAK LIGHT EMISSION

[75] Inventor: Philip B. Sackett, Burlington, Mass.

[73] Assignee: The United States of America as represented by the Secetary of the Air Force, Washington, D.C.

[22] Filed: May 21, 1974

[21] Appl. No.: 471,931

[52] U.S. Cl. ................. 356/201; 250/228; 356/236
[51] Int. Cl.² ........................................ G01N 21/24
[58] Field of Search ................... 356/236, 201, 103; 250/228

[56] References Cited
UNITED STATES PATENTS

| | | | |
|---|---|---|---|
| 3,170,068 | 2/1965 | Petriw et al. | 250/228 X |
| 3,222,522 | 12/1965 | Birkebak | 250/228 X |
| 3,319,071 | 5/1967 | Werth et al. | 356/236 X |
| 3,458,261 | 7/1969 | Bentley et al. | 250/228 X |

*Primary Examiner*—Palmer C. Demeo
*Attorney, Agent, or Firm*—Joseph E. Rusz; Henry S. Miller, Jr.

[57] ABSTRACT

A system for intensifying weak absorption and allowing the measurement of weak light emission in materials including a source of light, and a material-containing cavity having a highly reflective coating on its diffusely-reflecting inner surface. The cavity has an entry port for light and a port for a detecting instrument which is connected to an appropriate analysis or display system.

12 Claims, 3 Drawing Figures

3,920,336

SYSTEM FOR INTENSIFICATION OF WEAK ABSORPTION AND COLLECTION OF WEAK LIGHT EMISSION

BACKGROUND OF THE INVENTION

This invention relates generally to an optical system for studying energy transfer between molecules and more specifically to such a system of high accuracy where light is collected and intensified for purposes of enhancing both absorption and fluorescence.

Experiments have been performed which seek to study a luminescent phenomenon resulting from weak interactions between a material and light. Specifically, a weakly absorbing gas sample is irradiated with light from a tunable parametric oscillator; it subsequently emits fluorescence whose time-dependent intensity is proportional to the excited state population whose energy transfer properties are being studied. In this work it is necessary to tune the parametric oscillator to locate the peak of a weak absorption. Then, while monitoring absorption and exciting this peak, it is necessary to monitor the resulting weak fluorescence.

In systems known in the art, the fundamental approach utilizes a cylindrically shaped cavity. The cavity with a viewing port in its wall would allow light to make a single pass through its gas filled interior and then out, luminescence would be studied through the port. A more advanced cavity has been developed which includes a number of mirrors located at each end of a cavity allowing the light to reflect a finite number of times within the cavity before it escapes through the exit port.

This mode of reflection is generally referred to as multiple-pass reflection. Light absorption and emission generated as a result of a single-pass or multiple-pass techniques known to the art is generally very weak, in which case they provide only marginal information for study.

SUMMARY OF THE INVENTION

The invention provides a substantial improvement over similar prior art systems for reliably exciting a given absorption and for studying energy transfer between molecules by means of luminescent activity. Energy from some suitable light source is directed into a spherical cavity which may be glass of other suitable material. The cavity includes a highly reflective internal surface and a series of "dimples". The dimples are created from the external surface of the cavity and resemble small bumps internally and are located randomly around the sphere. The effect of the dimpling is to create a diffusely reflective surface. Light rays entering the cavity and emitted within the cavity are reflected off the dimples and nearby totally entrapped within the cavity. An exit port and filter on an axis other than that of the entering light is utilized for removal of scattered input light and for sampling the liminescence generated within the cavity. The intensity of the scattered input light provides a monitor of the degree of absorption within the cavity when no filter is present.

Appropriate detectors are associated with the viewing or exit port and are further connected to an amplifier and/or a readout or display system as needed.

In an alternative form, the invention utilizes a cavity having a single port. Collimated light enters the cavity in a normal fashion and luminescence is viewed by a detector offset from the path of the input light. In either form of the system, appropriate filtering will eliminate any possibility of unwanted input light reflecting into the detector, thus interfering with emission detection. The remainder of the system is as disclosed hereinbefore.

It is therefore an object of the invention to provide a new and improved system for studying energy transfer between molecules.

It is another object of the invention to provide a new and improved system to detect weak absorptions in material samples.

It is a further object of the invention to provide a new and improved system for collecting light emission generated by light absorption in an extended sample.

It is still another object of the invention to provide a new and improved system for studying other interactions between light and matter.

It is still a further object of the invention to provide a new and improved light-matter interaction study system that is more accurate than those of the prior art.

It is another object of the invention to provide a new and improved light-matter interaction system that utilizes a diffusely reflective cavity.

It is a further object of the invention to provide a new and improved cavity for studying energy transfer by means of luminescence.

It is another object of the invention to provide a new and improved cavity for studying light-matter interactions that requires only a single port.

It is another object of the invention to provide a new and improved cavity for studying light-matter interactions that is more efficient than prior art systems.

These and other advantages, features and objects of the invention will become more apparent from the following description taken in connection with the illustrative embodiment in the accompanying drawings.

DESCRIPTION OF THE PREFERRED EMBODIMENT

Figure 1:
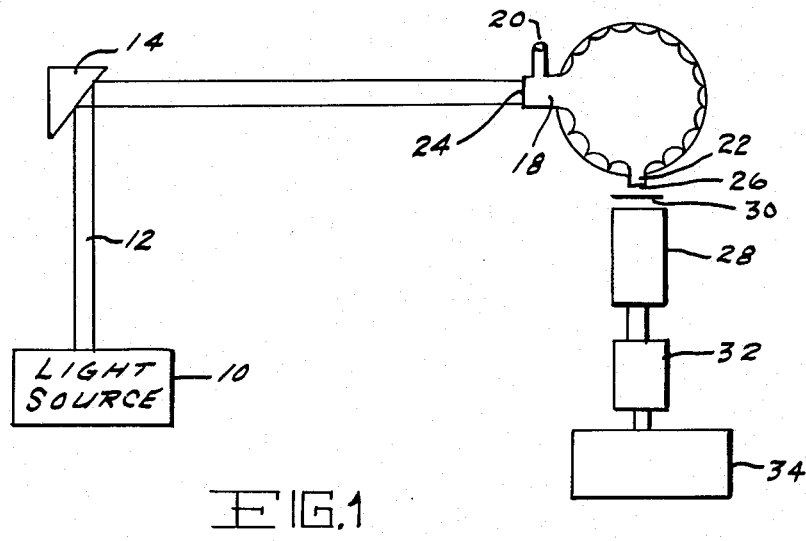
FIG. 1 is a schematic representation of the preferred embodiment of invention.

Referring now to FIG. 1, a coherent light source 10 generates a beam 12 that is reflected at 14 and sent to the spherical cavity 16. The cavity is equipped with a light entry port 18 of sufficient size to accommodate the light beam. An evacuation port 20 is located on the inlet port for achieving the degree of isolation required in the cavity. Light entering the cavity is entrapped within the cavity and absorbed, causing luminescence which decreases in time due to energy transfer between the gas molecules. An exit port 22 is provided for viewing the luminescence created within the cavity. The ports 18 and 22 are sealed with sapphire windows 24, 26, to provide a gas tight cell. The spherical cavity is internally gold plated and dimpled as will be explained hereinafter to provide a highly diffusely reflective surface.

A suitable detector 28 for infrared or visible light is positioned near the exit window and views light which passes through the restrictive filter 30. The detector is connected through the amplifier 32 to the display 34.

Figure 2:
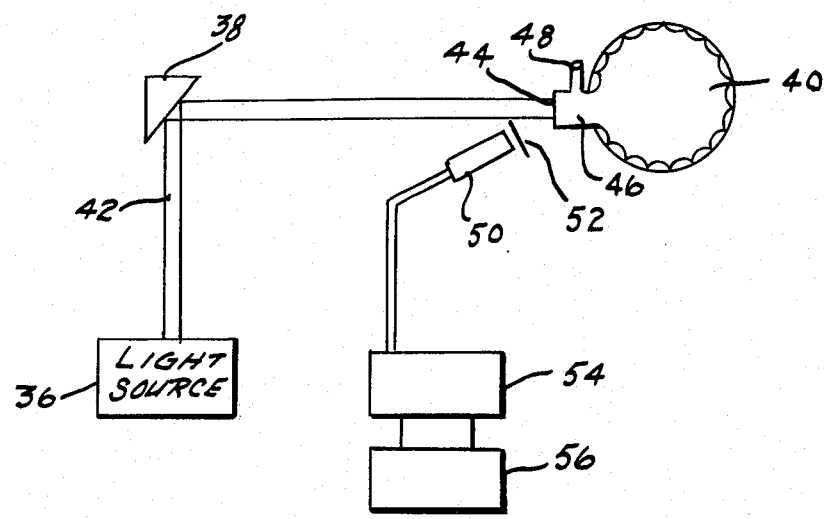
FIG. 2 is an alternative form of the invention in schematic representation.

Concerning FIG. 2, there is shown the light source 36, mirror 38 and cavity 40. The light beam 42 enters the cavity through sapphire window 44 mounted on port 46. The cavity is evacuated via port 48. Luminescence is generated as before and is viewed by a detector 50 offset from the port 46 and protected from the light beam by the filter 52. The detector 50 is connected to amplifier 54 and thence to the display 56.

Figure 3:
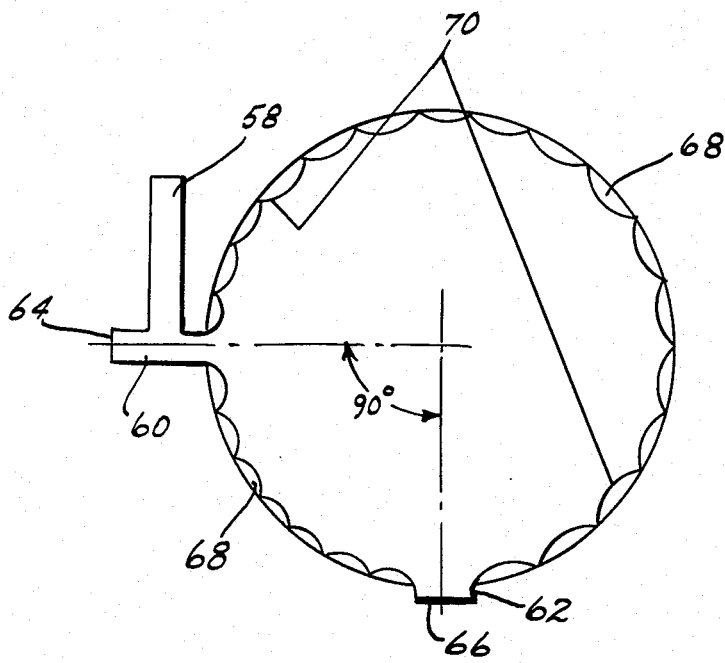
FIG. 3 is a schematic representation of the cavity used in the preferred embodiment of invention.

FIG. 3 shows the spherical cavity 16 in schematic form. The evacuation port 58 is connected to the light input port 60. An exit port 62 is located at 90° to the inlet port but may be positioned otherwise depending upon the study to be conducted. Each port is covered with a sapphire window 64, 66 and sealed with a heat-sealing wax to produce a vacuum tight gas cell. The cavity is formed of pyrex glass and is dimpled 68 randomly. The interior of the cavity is coated with a highly reflective material such as gold 70. The dimpling creates a diffusely reflective surface which promotes scattering.

In operation, the cavity is filled with the gas to be studied, then evacuated to achieve the concentration desired.

Although the invention has been described with respect to a particular embodiment, it will be understood to those skilled in the art that this invention is also capable of a variety of alternate embodiments involving, for example, variations in cavity shape, material of cavity construction, number of separate pieces used in cavity construction, treatment for rendering the surface diffusely reflective, treatment for rendering the surface highly reflective, materials used for windows if needed, technique for fastening windows if needed, and method of introduction of material sample. With appropriate variations, this invention is well suited to experiments on gaseous, liquid, and solid samples in many diverse experiments as, for example, time-resolved fluorescence, fluorescence spectroscopy, chemiluminescence from photo-initiated reactions, and Raman scattering.

Having thus described my invention, I make the following claims:

1. A system for monitoring and intensifying weak absorption and for collecting and studying weak light-emission comprising: a source of light; a cavity having its internal surface highly reflective; means for introducing and maintaining a material sample within the cavity; means for directing light into the cavity; means for introducing light into the cavity; means for removing light from the cavity, said means lying on an axis other than the light entrance axis; means associated with the cavity for filtering light exiting from the cavity; means for detecting light exiting the cavity; amplifier means connected to the means for detecting, and analysis means having a display connected to the amplifier means for providing an indication of the intensity of the absorption or emission within the cavity.

2. A system for monitoring and intensifying weak absorption and for studying and collecting weak light emission according to claim 1 where said cavity internal surface is diffusely reflective.

3. A system for monitoring and intensifying weak absorption and for studying and collecting weak light emission according to claim 2 wherein said means for introducing light into and for removing light from the cavity are provided respectively by a light inlet port in the wall of the cavity and an exit port separated from the light inlet port in the wall of the cavity.

4. A system for monitoring and intensifying weak absorption and for collecting and studying weak light emission according to claim 3 wherein said cavity is spherical.

5. A system for monitoring and intensifying weak absorption and for collecting and studying weak light according to claim 4 wherein said cavity is constructed of glass.

6. A system for monitoring and intensifying weak absorption and for collecting and studying weak light emission according to claim 5 wherein the said diffuse reflection of said cavity is provided by a dimpled interior surface.

7. A system for monitoring and intensifying weak absorption and for collecting and studying weak light emission according to claim 6 wherein the said high reflectivity of said cavity is provided by a gold coating on the interior surface.

8. A system for monitoring and intensifying weak absorption and for collecting and studying weak light emission according to claim 7 wherein said inlet and exit ports are provided with sealed sapphire windows.

9. A system for monitoring and intensifying weak absorption and for collecting and studying weak light emission according to claim 2 wherein said means for introducing light into and for removing light from the cavity is provided by a single inlet-exit port in the wall of the cavity.

10. A system for monitoring and intensifying weak absorption and for collecting and studying weak light emission according to claim 9 wherein the said diffuse reflection of said cavity is provided by a dimpled interior surface.

11. A system for monitoring and intensifying weak absorption and for collecting and studying weak light emission according to claim 10 wherein the said high reflectivity of said cavity is provided by a gold coating on the interior surface.

12. A system for monitoring and intensifying weak absorption and for collecting and studying weak light emission according to claim 11 wherein said inlet-exit port is provided with a sealed sapphire window.

* * * * *